April 13, 1926.
W. GANZ
STEERING GEAR LOCK
Filed Oct. 14, 1921
1,580,881
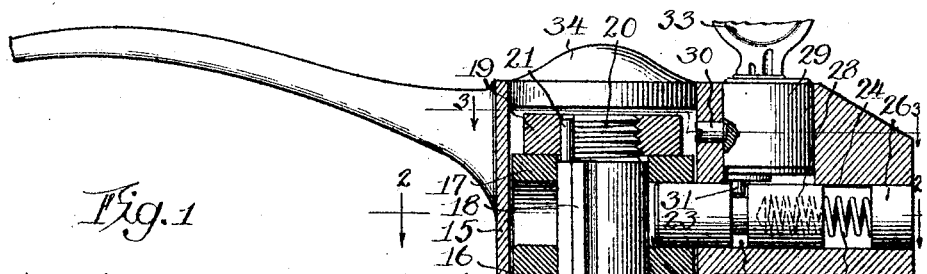
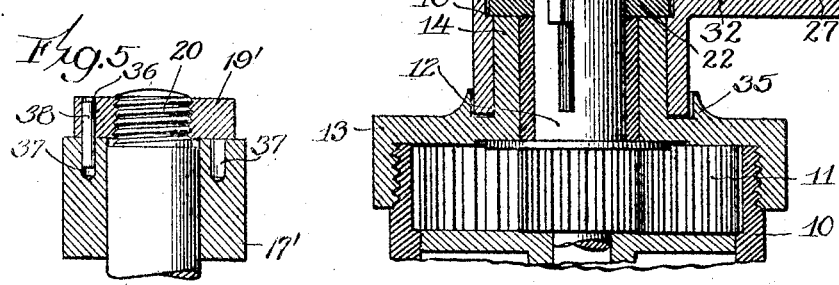
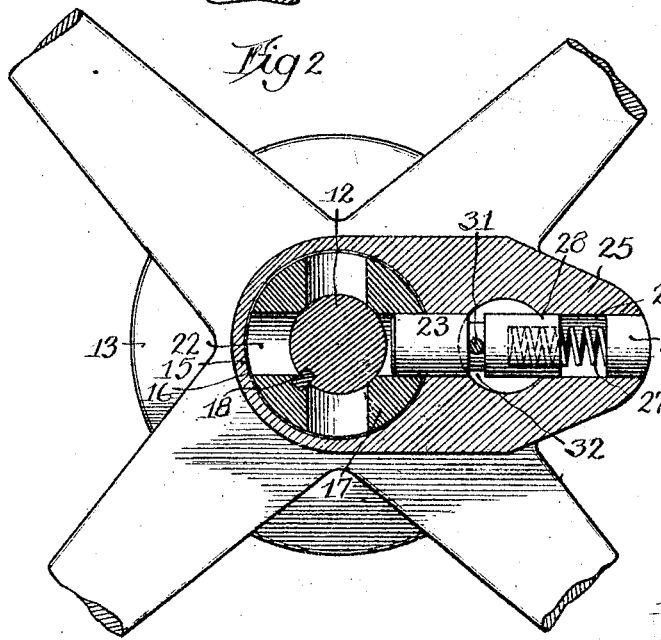
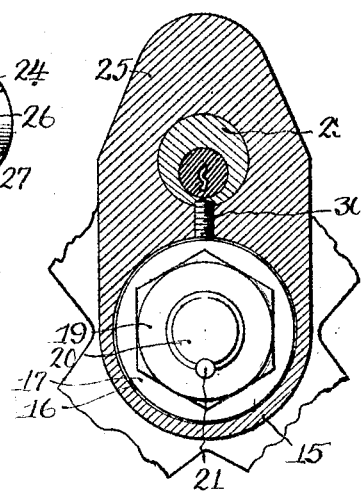
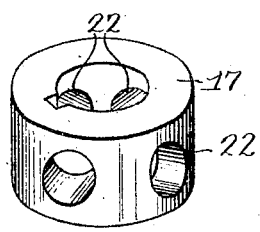
Inventor,
William Ganz
By Patented Apr. 13, 1926.

1,580,881

UNITED STATES PATENT OFFICE.

WILLIAM GANZ, OF RIDGEFIELD PARK, NEW JERSEY, ASSIGNOR TO BAUER LOCK COMPANY, OF CHICAGO, ILLINOIS, A CORPORATION OF DELAWARE.

STEERING-GEAR LOCK.

Application filed October 14, 1921. Serial No. 507,739.

*To all whom it may concern:*

Be it known that I, WILLIAM GANZ, a citizen of the United States, residing at Ridgefield Park, in the county of Bergen and State of New Jersey, have invented certain new and useful Improvements in Steering-Gear Locks, of which the following is a specification.

This invention relates to steering gears for automobiles and has for its principal object to provide a connection between the steering wheel and the steering shaft whereby they may be securely locked together for service, and as securely locked separate when it is desired to put the automobile out of service.

Another object of this invention is to provide a structure of this kind which will effectually resist the attempts of unauthorized persons to secure the wheel to the steering shaft.

Another object is to provide a structure in which driving engagement between the wheel and the shaft is absolutely impossible when the lock is in the proper position.

Further objects of the invention will become apparent as the description is read in connection with the accompanying drawing showing a selected embodiment of the invention, and in which—

Fig. 1 is a sectional view showing the devices in position to lock the wheel to the steering shaft;

Fig. 2 is a transverse section on the line 2—2 of Fig. 1;

Fig. 3 is a transverse sectional view on the line 3—3 of Fig. 1; and

Fig. 4 is a perspective view of a collar secured to the steering shaft.

Fig. 5 is a view illustrating a modified form of part of my invention.

In the selected embodiment here illustrated, I have shown the device applied to a well known type of automobile in which the steering column has at its upper end a gear housing 10 for planetary gearing 11 by which the upper section 12 of the steering shaft drives the lower section, not shown. In applying my invention, I remove the usual cover to the gear case 10 and replace it with a steel cap 13 having at its upper side a tubular flange 14 surrounding the spindle 12. Journaled on this flange is the hub 15, or a barrel adapted to be secured to the hub of the wheel. In either case, this element is of sufficient length to extend from the cover portion of the cap 13 to a point above the end of the shaft 12, and it is counter-bored to form a shoulder 16. A collar 17 is mounted on the shaft 12 and keyed thereto by the key 18, which normally holds the steering wheel to the spindle in this type of automobile. The collar is sufficiently smaller than the bore of the hub 15 to preclude any binding engagement between them sufficient to steer the wheels of the vehicle. I have found it very satisfactory to make the collar about one-sixty-fourth (1/64) of an inch smaller all around than the bore of the hub. A nut 19 is screwed on the threaded end 20 of the shaft and against the upper side of the collar 19. To secure this nut against unauthorized removal, I cut a key-way in the shaft and the nut and drive therein a hardened steel key 21, taking care to place the upper end of the key slightly below the surface of the nut 19. The key way is made somewhat smaller than the key so that considerable force is required to drive the key to the position shown, and correspondingly considerable force would be necessary to remove it.

In order to secure the wheel to the shaft 12, I provide the collar 17 with a plurality of openings 22 adapted to receive a pin 23 slidably mounted in the socket 24 in the hub 15 of the wheel, which is conveniently equipped with an enlargement 25 on one side thereof. Preferably the pin 23 is inserted from the right in Fig. 1 and afterwards the end of the socket 24 is permanently closed by a plug 26 which may be secured in place in any suitable manner. A spring 27 having one end against the plug 26 and the other end in a suitable seat 28 in the pin 23 normally tends to hold the pin in one of the sockets 22 in the collar 17. A lock 29 mounted in the enlargement 25 of the wheel hub and secured in place by a screw 30 or other suitable device is equipped with an eccentric pin 31 projecting into a groove 32 in pin 23 whereby the pin may be retracted from the socket 22 in the collar 17, or allowed to slide into said socket by proper operation of the key 33.

The upper end of the hub 15 may be closed with a cap 34 of any suitable kind, which may be ornamental or carry any identification device desired.

The cap 13 is permanently secured to the housing 10 so that a removal can only be accomplished by destruction of the cap or the housing, or both, and the locking of the nut 19, as above described, makes it practically impossible to remove that nut in order to attempt a taking apart of the device by an unauthorized person. The lock 29, of course, will be such as to resist skillful lock pickers and will be secured in the hub so that it cannot be removed without destroying the lock or the hub, or both.

It will therefore be apparent that without the use of the key 33 it will be practically impossible to move the pin 23 into one of the sockets so as to permit the vehicle to be steered. The difference in the diameters of the hub 15 and the collar 17, together with the proper boring between the hub and the flange 14 makes it impossible to wrench the wheel to the side or otherwise obtain a binding engagement between the hub and the collar 17 that would effect the steering of the wheel when the pin 23 is withdrawn from its socket in the collar 17.

The shoulder 16 is of ample width to provide proper contact with the lower face of collar 17, and the length of the flange 14 is sufficient to give the wheel a steady mounting, preventing the looseness common in other devices of this general character with which I am familiar.

I prefer to provide a flange 35 on the cap 13 surrounding the lower end of the hub 15 to make it impossible to bind the hub to the collar 17 by wedging or prying against bottom of the hub.

In Fig. 5 I have shown a modified form of lock for nut 19'. The nut has a passage 36 adapted to align with one of a series of sockets 37 in the collar 17' and provide a tight fitting receptacle for a locking pin 38. By making the bores in the nut and collar, a close driving fit and driving the hardened pin below the surface of the nut, it is practically impossible to take the device apart without destroying the parts and attracting attention.

I am aware that a considerable number of changes in the construction and arrangement of parts might readily be made by anyone skilled in the art without departing from the scope of my invention and I do not care to be limited to the particular embodiment herein shown and described.

I claim:

1. In a device of the class described, a steering column, having a housing at its upper end, a cap permanently secured to said housing and having a cylindrical flange thereon, a steering shaft in said steering column and projecting through said cylindrical flange, a steering wheel having a hub embracing and journalled on said cylindrical flange and loosely embracing the upper portion of the steering shaft, and means for engaging said steering wheel with said steering shaft above the cylindrical flange, or disengaging it therefrom at will.

2. In a device of the class described, a steering column, a steering shaft journalled therein and projecting thereabove, a cover permanently secured to said steering column and having a flange surrounding said steering shaft, a wheel hub embracing and journalled on said flange and loosely embracing the upper portion of the steering shaft a collar permanently secured to said shaft, above the flange, and a lock carried by said wheel adapted to effect a driving engagement between said wheel and said collar.

3. In a device of the class described, a steering column, a cover secured to said column and having a flange projecting upwardly therefrom, a steering wheel having a hub embracing and journalled on said flange and counter-bored above the flange to form an internal shoulder, a steering shaft projecting from said steering column through said flange, said hub loosely embracing the upper portion of the steering shaft, a collar secured to said shaft above the flange and within said counterbore, said collar overhanging the shoulder within the bore of the wheel, means for securing said collar to said shaft permanently, and a lock carried by said wheel hub and adapted to engage said collar to effect a driving connection between said wheel hub and said shaft.

4. The combination with a steering column having a gearing case at the upper end, a steering shaft projecting above said case, a cap secured to said case and having a flange forming a bearing for said shaft, a steering wheel journalled on said flange and having an internal shoulder, a collar secured to said shaft above said shoulder and means for locking said wheel to said collar.

5. The combination with a steering column having a gearing case at the upper end, a steering shaft projecting above said case, a cap secured to said case and having a flange forming a bearing for said shaft, a steering wheel journalled on said flange and having an internal shoulder, a collar of considerably smaller diameter than the bore of the hub secured to said shaft and engaging said shoulder and a key-controlled bolt for locking said wheel on said collar.

6. The combination with a steering column having a gear case at its upper end, a cap carried by said gear case and having a cylindrical flange projecting upwardly therefrom, a steering shaft journalled in said flange, a steering wheel journalled on said flange and having a shoulder in its bore, a collar on said steering shaft and engaging said shoulder, a nut threaded on said shaft against said collar and a hardened key driven below the surface of said nut and locking said nut in place.

7. The combination with a steering column having a gear case at its upper end, a cap secured to said gear case and having a cylindrical flange extending upwardly therefrom, a steering shaft journalled in said flange, a steering wheel journalled on said flange, means for locking said steering wheel to said steering shaft and a second flange on said cap surrounding the edge of said wheel adjacent to the cylindrical flange.

8. In a device of the class described, a steering column, a shaft journaled therein and projecting thereabove, a collar secured to said shaft above said column, a steering wheel having a hub open at its top and bottom and rotatably embracing the collar, said hub being counterbored to provide an internal annular shoulder underlying the collar, locking means carried by the steering wheel for engagement with the collar, and a nut threaded upon the top of the steering shaft and in engagement with the top of the collar and also keyed to the shaft.

WILLIAM GANZ.